(12) United States Patent
Lee et al.

(10) Patent No.: US 8,120,271 B2
(45) Date of Patent: Feb. 21, 2012

(54) MULTI-LAMP DRIVING CIRCUIT

(75) Inventors: Chi-Hsiung Lee, Jhongli (TW); Yu-Hsiao Chao, Jhongli (TW); Hung-Yi Chen, Jhongli (TW)

(73) Assignee: Ampower Technology Co., Ltd., Jhongli, Taoyuan County (TW)

( * ) Notice: Subject to any disclaimer, the term of this patent is extended or adjusted under 35 U.S.C. 154(b) by 273 days.

(21) Appl. No.: 12/603,661

(22) Filed: Oct. 22, 2009

(65) Prior Publication Data

US 2010/0181928 A1    Jul. 22, 2010

(30) Foreign Application Priority Data

Jan. 16, 2009   (CN) .................. 2009 2 0129517 U

(51) Int. Cl.
*H05B 41/24* (2006.01)
(52) U.S. Cl. ................... 315/277; 315/291; 315/255
(58) Field of Classification Search ........... 315/246, 315/250, 254, 255, 276, 277, 291, 294, 299
See application file for complete search history.

(56) References Cited

U.S. PATENT DOCUMENTS

| | | | |
|---|---|---|---|
| 7,250,731 B2 * | 7/2007 | Jin | 315/282 |
| 7,446,641 B2 * | 11/2008 | Fushimi | 336/212 |
| 7,944,152 B2 * | 5/2011 | Lee et al. | 315/277 |
| 2008/0116823 A1 * | 5/2008 | Chan et al. | 315/277 |
| 2009/0195173 A1 * | 8/2009 | Morimoto | 315/277 |

* cited by examiner

*Primary Examiner* — Douglas W Owens
*Assistant Examiner* — Amy Yang
(74) *Attorney, Agent, or Firm* — Altis Law Group, Inc.

(57) ABSTRACT

A multi-lamp driving circuit for driving a plurality of lamp groups includes an inversion circuit configured to drive the plurality of lamp groups and a current balance circuit electrically connected between the inversion circuit and the plurality of lamp groups. The current balance circuit includes a plurality of transformers, each including a first magnetic loop composed of a first primary winding and a first secondary winding and a second magnetic loop composed of a second primary winding and a second secondary winding. Numbers of turns of the second primary winding and the second secondary winding of each of the plurality of transformers are equivalent, and numbers of turns of the first primary winding and the first secondary winding of each of the plurality of transformers are equivalent.

6 Claims, 3 Drawing Sheets

MULTI-LAMP DRIVING CIRCUIT

BACKGROUND

1. Technical Field

The disclosure relates to display devices, and particularly to a multi-lamp driving circuit for a backlight module of a liquid crystal display (LCD) device.

2. Description of Related Art

Discharge lamps are commonly employed as backlights in liquid crystal display (LCD) devices. In larger liquid crystal display (LCD) devices, such as televisions, a plurality of discharge lamps are often employed to achieve better lighting and meet practical brightness requirements. In practice, current flowing through the plurality of discharge lamps are difficult to be uniform due to different electrical characteristics of the lamps, which results in uneven brightness for the LCD devices.

A commonly used multi-lamp driving circuit directs transformers disposed between two ends of the lamps to balance current flowing through the lamps, with one lamp connected to one transformer therein. However, with an increase in the number of lamps, the number of transformers increases correspondingly, resulting in increased device size and cost.

Therefore, a need exists in the industry to overcome the described limitations.

DETAILED DESCRIPTION

Figure 1:
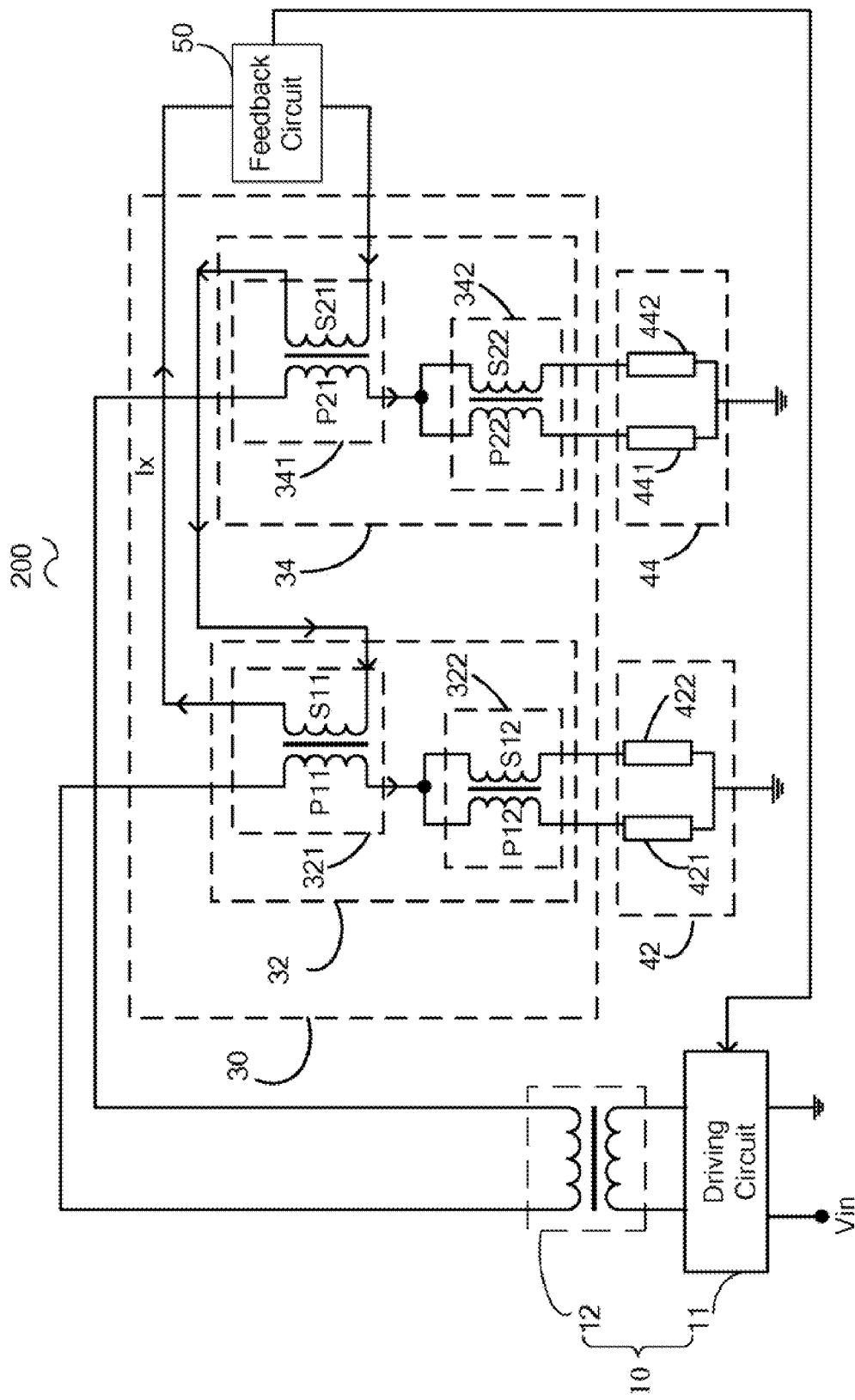
FIG. 1 is a schematic diagram of a multi-lamp driving circuit in accordance with a first exemplary embodiment of the disclosure.

FIG. 1 is a schematic diagram of a multi-lamp driving circuit 200 in accordance with a first exemplary embodiment of the disclosure. The multi-lamp driving circuit 200 is operable to drive a plurality of lamps 421, 422, 441, and 442, and comprises an inversion circuit 10, a current balance circuit 30, and a feedback circuit 50. In the embodiment, the plurality of lamps 421, 422, 441, and 442 are divided into groups 42, 44, each comprising two lamps, such as lamps 421 and 422 making up group 42, and lamps 441 and 442 making up group 44.

The inversion circuit 10 comprises a driving circuit 11 and a booster transformer 12 with a primary winding coupled to the driving circuit 11, and is configured to transform input signals into electrical signals suitable to drive the plurality of lamp groups 42, 44.

The current balance circuit 30 is electrically connected between the inversion circuit 10 and the plurality of lamp groups 42, 44, and comprises a plurality of transformer circuits 32, 34. Each of the transformer circuits 32, 34 is composed of one transformer.

In this exemplary embodiment, only two lamp groups, such as a first lamp groups 42 and a second lamp groups 44, are shown for simplification and convenience of description. Accordingly, the current balance circuit 30 comprises two transformers, a first transformer 32 and a second transformer 34, configured to balance current flowing through the two lamp groups 42, 44.

The first transformer 32 comprises a first magnetic loop 321 comprising a first primary winding P11 and a first secondary winding S11 and a second magnetic loop 322 comprising a second primary winding P12 and a second secondary winding S12. Similarly, the second transformer 34 comprises a third magnetic loop 341 comprising a third primary winding P21 and a third secondary winding S21 and a fourth magnetic loop 342 comprising a fourth primary winding P22 and a fourth secondary winding S22.

In this exemplary embodiment, input ends of the second primary and secondary windings P12, S12 of the first transformer 32 are connected to one end of the first primary winding P11 of the first transformer 32, and output ends of the second primary and secondary windings P12, S12 of the first transformer 32 are respectively connected to the two lamps 421, 422 of the first lamp groups 42. In the embodiment, numbers of turns of the second primary and secondary windings P12, S12 of the first transformer 32 are equivalent, such that the current flowing therethrough are equal, correspondingly the current flowing through the lamps 421 and 422 are normalized and balanced.

Another end of the first primary winding P11 of the first transformer 32 is electrically connected to the inversion circuit 10 to receive the electrical signals.

Similarly, input ends of the fourth primary and the secondary windings P22, S22 of the second transformer 34 are connected to one end of the third primary winding P21 of the second transformer 34, and output ends of the fourth primary and secondary windings P22, S22 of the second transformer 34 are respectively connected to the two lamps 441, 442 of the second lamp groups 44. In this exemplary embodiment, numbers of turns of the fourth primary and secondary windings P22, S22 of the second transformer 34 are equivalent, so that the current flowing therethrough are equivalent, correspondingly the current flowing through the lamps 441 and 442 are normalized and balanced.

Another end of the third primary winding P21 of the second transformer 34 is electrically connected to the inversion circuit 10 to receive the electrical signals.

The first secondary winding S11 of the first transformer 32 and the third secondary winding S21 of the second transformer 34 are connected to each other in series to structure a closed loop to conduct a current Ix. In the illustrated embodiment, numbers of turns of the first primary and secondary windings P11, S11 of the first transformer 32 are equivalent, and numbers of turns of the third primary and secondary windings P21, S21 of the second transformer 34 are equivalent, so that, current flowing through the first primary winding P11 of the first transformer 32 and the third primary winding P21 of the second transformer 34 are normalized and balanced.

In this exemplary embodiment, since current flowing through the first primary winding P11 of the first transformer 32 and the third primary winding P21 of the second transformer 34 are balanced, and the current flowing through the second primary and secondary windings P12, S12 of the first transformer 32 and through the fourth primary and secondary windings P22, S22 of the second transformer 34 are respectively balanced, the current flowing through the lamps 421, 422, 441 and 442 are correspondingly balanced.

While in this exemplary embodiment, the number of lamp groups is two, the number of lamp groups can be more, with the number of transformers corresponding thereto.

The feedback circuit 50 is electrically connected between the closed loop and the driving circuit 11 so as to generate and send a feedback signal to the inversion circuit 10 according to the changes of the current Ix in the closed loop. In the exemplary embodiment, the feedback circuit 50 may be a pulse width modulation (PWM) controller.

Figure 2:
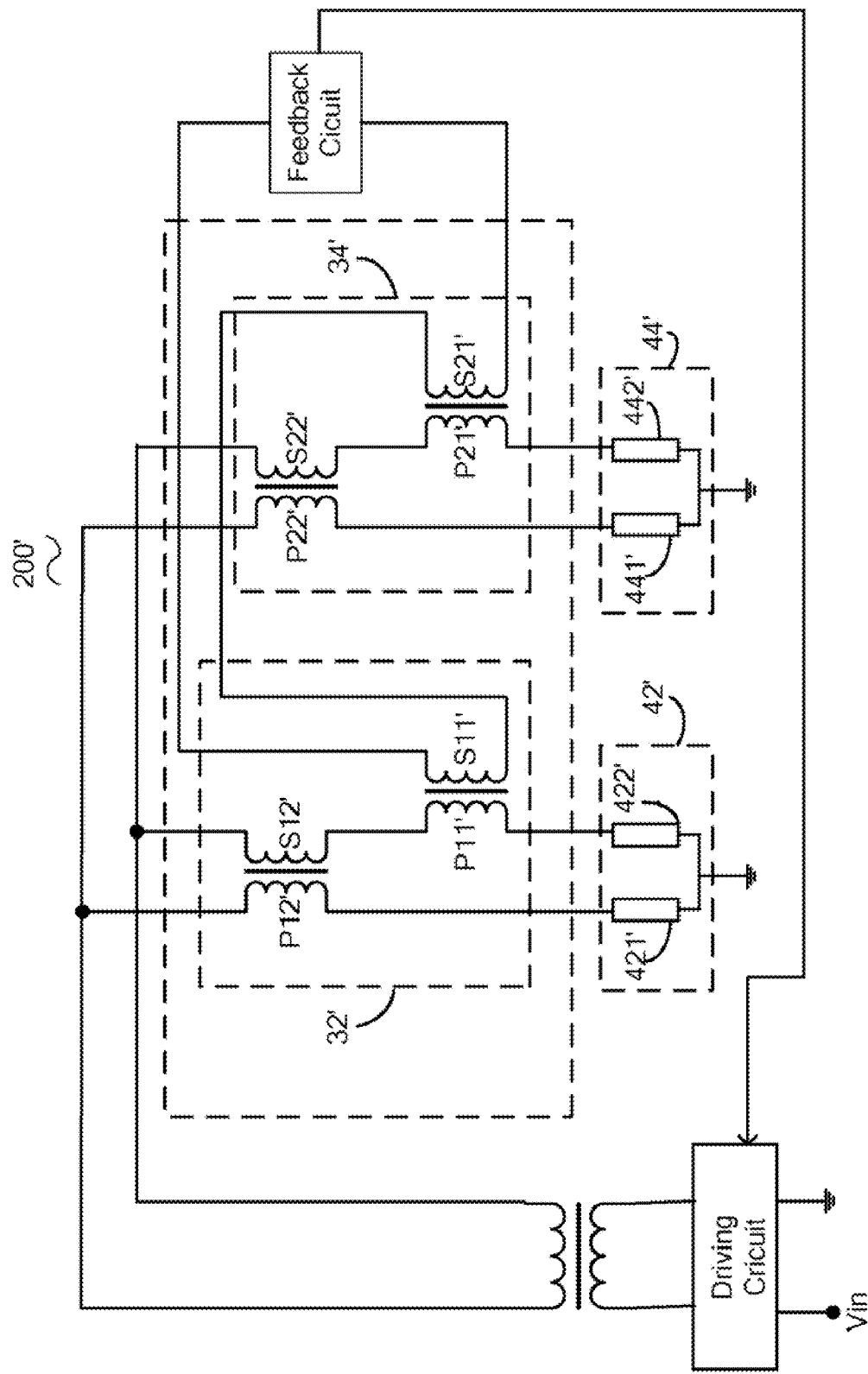
FIG. 2 is a schematic diagram of a multi-lamp driving circuit in accordance with a second exemplary embodiment of the disclosure.

FIG. 2 is a schematic diagram of a multi-lamp driving circuit 200' in accordance with a second exemplary embodiment of the disclosure. The multi-lamp driving circuit 200' has the same configuration and can substantially perform the same function as the multi-lamp driving circuit 200 illustrated in FIG. 1, differing in connectivity of the four windings of the transformer.

In this exemplary embodiment, two ends of a first primary winding P11' of a first converter 32' are electrically connected to a second secondary winding S12' of the first transformer 32' and one lamp 422' of a first lamp group 42', respectively. Two ends of the second primary winding P12' of the first transformer 32' are connected to the inversion circuit and other lamp 421' of the first lamp groups 42', respectively.

Similarly, two ends of a third primary winding P21' of a second transformer 34' are electrically connected to a fourth secondary winding S22' of the second transformer 34' and one lamp 442' of a second lamp groups 44', respectively. Two ends of the fourth primary winding P22' of the second transformer 34' are connected to the inversion circuit and other lamp 441' of the second lamp groups 44', respectively.

Figure 3:
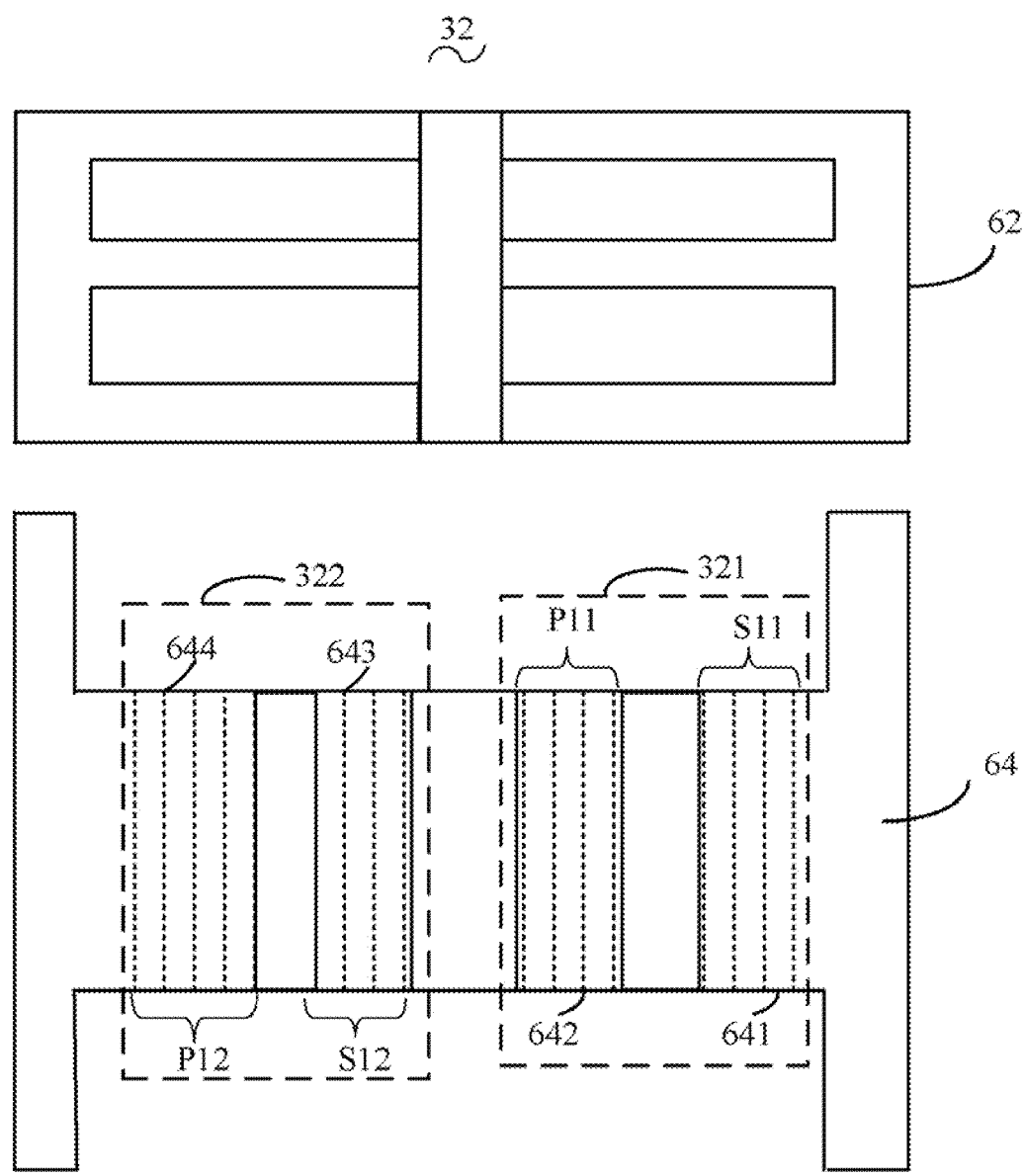
FIG. 3 is a schematic diagram of one of a plurality of transformers of FIG. 1.

FIG. 3 is a schematic diagram of the transformer 302 of the multi-lamp driving circuit 200 illustrated in FIG. 1. The transformer 32 includes a magnetic core 62, a bobbin 64, the first primary winding P11, the first secondary winding S11, the second primary winding P12, and the second secondary primary winding S12. In the illustrated embodiments, the magnetic core 62 of the transformer 32 comprises two E type magnetic cores joined together. Alternatively, the magnetic core 62 of the transformer 32 may be an E1 type magnetic core.

The bobbin 64 comprises four winding grooves configured to respectively receive the first primary winding P11, the first secondary winding S11, the second primary winding P12, and the second secondary primary winding S12. The magnetic core 62 passes through the bobbin 66, and the first primary winding P11 and the first secondary winding S11 make up the first magnetic loop 322, and the second primary winding P12 and the second secondary primary winding S12 make up the second magnetic loop 34.

Each of the transformer circuits of the multi-lamp driving circuit of the disclosure includes one transformer that comprises two magnetic loops to balance current flowing through two lamps, that is, two lamps are connected one transformer, which results in a decreased number of transformers and commensurately minimized device size.

It is believed that the exemplary embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A multi-lamp driving circuit for driving a plurality of lamp groups, each lamp group comprising two lamps, the multi-lamp driving circuit comprising:
    an inversion circuit configured to generate electrical signals suitable to drive the plurality of lamp groups; and
    a current balance circuit electrically connected between the inversion circuit and the plurality of lamp groups, and comprising a plurality of transformer circuits, each transformer circuit comprising one transformer that comprises a first magnetic loop comprising a first primary winding and a first secondary winding, and a second magnetic loop comprising a second primary winding and a second secondary winding;
    wherein two ends of the first primary winding are connected to one end of the second secondary winding of each of the transformers and one lamp of a corresponding lamp group, respectively, and two ends of the second primary winding of each of the transformers are connected to the inversion circuit and the other lamp of the corresponding lamp group, respectively;
    wherein the first secondary windings of the plurality of transformers are connected to each other in series to make up a closed loop that conducts a current to balance current flowing through each of the plurality of lamp groups;
    wherein the second primary winding and the second secondary winding of each of the plurality of transformers are connected to the two lamps of one of the plurality of lamp groups to balance current flowing through the two lamps thereof, respectively, and numbers of turns of the second primary winding and the second secondary winding of each of the plurality of transformers are equivalent.

2. The multi-lamp driving system of claim 1, wherein each of the plurality of transformers comprises a bobbin comprising four winding grooves to respectively receive the first primary winding, the first secondary winding, the second primary winding, and the second secondary winding, forming the first magnetic loop and the second magnetic loop.

3. The multi-lamp driving system of claim 1, wherein numbers of turns of the first primary winding and the first secondary winding of each of the plurality of transformers is equivalent.

4. The multi-lamp driving system of claim 1, wherein the inversion circuit comprises a driving circuit and a booster transform with a primary winding connected to the driving circuit, and transforms input signals to electrical signals suitable to drive the plurality of lamp groups.

5. The multi-lamp driving system of claim 1, further comprising a feedback circuit connected between the closed loop and the driving circuit to generate and send a feedback signal to the inversion circuit according to changes in the current of the closed loop.

6. The multi-lamp driving system of claim 5, wherein the feedback circuit is a pulse-width modulation (PWM) controller.

* * * * *